United States Patent [19]

Pennewiss et al.

[11] 4,105,519

[45] Aug. 8, 1978

[54] POLYMERIZATION METHOD USING ULTRAVIOLET LIGHT

[75] Inventors: Horst Pennewiss, Darmstadt-Neu-Kranichstein; Hermann Plainer, Darmstadt; Peter Quis, Darmstadt-Neu-Kranichstein; Hans Trabitzsch, Seeheim; Juergen Masanek, Pfungstadt; Juergen Jakob, Lorsch, all of Fed. Rep. of Germany

[73] Assignee: Rohm GmbH, Darmstadt, Fed. Rep. of Germany

[21] Appl. No.: 729,677

[22] Filed: Oct. 5, 1976

[30] Foreign Application Priority Data

Oct. 9, 1975 [DE] Fed. Rep. of Germany ....... 2545290

[51] Int. Cl.$^2$ ............................ C08F 2/50; C08F 4/00
[52] U.S. Cl. ............................ 204/159.23; 96/115 P; 526/208; 526/213; 526/303
[58] Field of Search ................. 204/159.23; 96/115 P

[56] References Cited

U.S. PATENT DOCUMENTS

| 3,130,050 | 4/1964 | Schwerin ..................... 96/115 P X |
| 3,368,900 | 2/1968 | Burg ............................. 204/159.23 X |
| 3,819,496 | 6/1974 | Roskott et al. ............. 204/159.23 X |

FOREIGN PATENT DOCUMENTS 1,046,317 12/1958 Fed. Rep. of Germany.
906,142 9/1962 United Kingdom.

*Primary Examiner*—Walter C. Danison
*Attorney, Agent, or Firm*—Curtis, Morris & Safford

[57] ABSTRACT

A method for polymerizing or copolymerizing water-soluble monomers, in a layer thickness between 2 and 100 mm, and at a temperature between 0° C. and 100° C., by irradiation with ultraviolet light in the presence of atmospheric oxygen, wherein the material to be polymerized contains at least 1 ppm of a water-soluble anthraquinone unsubstituted in the 1,4,5, and 8-positions and at least 10 ppm of dissolved chloride ions.

6 Claims, No Drawings

POLYMERIZATION METHOD USING ULTRAVIOLET LIGHT

The present invention relates to an improved polymerization method using ultraviolet light.

In the free-radical polymerization of unsaturated monomers, a considerable amount of heat is set free. If the heat is not conducted away during the polymerization, the polymerizing mixture can heat up to more than 100° C. As a result of such heating, the monomer, to the extent it is volatile, or — in the case of solution polymerization — the solvent, can evaporate, or the polymer can develop bubbles. In many cases, the mixture turns dark in color or the polymer cross-links. In other cases, the molecular weight can decrease as soon as the polymerization temperature strongly increases. The undesired increase in temperature, known in technical terminology as "running away", is particularly difficult to avoid if the undiluted monomer or monomer mixture, or a concentrated solution thereof, is polymerized in a coherent layer with insufficient possibilities for cooling. Even layers of 2 mm in thickness can overheat on polymerization.

The overheating is attributable to an auto-accelerating effect. The initiator necessary for free-radical formation decomposes with increasing temperature ever more quickly and thereby accelerates the polymerization and the increase in temperature. This is an adiabatic polymerization. The stream of free radicals, and therwith also the rate of polymerization, nevertheless can be controlled, i.e. made to correlate with the possibilities at hand for cooling, if ultraviolet light is employed for free radical formation. The formation of new radicals and the progression of polymerization can at any time be interrupted by turning off the ultraviolet light. Nevertheless, it has proved that this interruption fails if the polymerization is carried out in the presence of atmospheric oxygen. In this case, the adiabatic polymerization continues under the influence of self-heating when the ultraviolet light is turned off, as soon as the polymerizing mixture has exceeded a temperature of about 40° C. to 60° C.

At low temperatures, atmospheric oxygen has an influence inhibiting polymerization. Polymerization in thin layers, on admission of atmospheric oxygen, can only be initiated with ultraviolet light if considerable amounts of a photosensitizer are employed. As such a photosensitizer, anthraquinone derivatives, for example, have been used for the polymerization of extremely thin layers. Under the influence of ultraviolet light, these anthraquinone derivatives produce such a strong stream of free radicals that the inhibiting effect of oxygen is overcome. At layer thicknesses of 2 mm or more, the influence of oxygen on the exposed surface is essentially stronger than on the underside of the layer. If the polymerizing material is present on a cooled carrier, polymerization in the lower region of the layer can be controlled by cooling. In the intermediate portion of the layer, neither a sufficient cooling nor a strong inhibition by oxygen takes place, so that here the polymerization rate is the greatest. In this region, thus, the feared "running away" occurs if the temperature in the region exceeds 40° C to 60° C.

The object of the present invention is a process for the free radical polymerization or copolymerization of unsaturated water-soluble monomers or monomer mixtures, alone or in admixture with non-polymerizable inert materials, said mixture having a content from 0.2 to 2, preferably from 0.5 to 2, equivalents of polymerizable double bonds per 100 grams of the material to be polymerized in a layer thickness between 2 and 100 mm at temperatures between 0° C. and 100° C. using ultraviolet light in the presence of atmospheric oxygen. This object is achieved according to the invention if the material to be polymerized contains at least 1 ppm (1 part by weight per million parts by weight of material) of a water-soluble anthraquinone derivative unsubstituted in the 1,4,5 and 8-positions, and contains also at least 10 ppm of dissolved chloride ions.

In a polymerization initiated by ultraviolet light in the presence of atmospheric oxygen, anthraquinone derivatives strongly further polymerization. While, in the polymerization of layers less than 2 mm in thickness, this effect can be utilized soforth, since an adiabatic polymerization does not occur in such thin layers, when layer thicknesses of 2 mm and more are involved the rate of polymerization must be adjusted to the possibilities for conductive removal of heat, i.e. an isothermal course of polymerization must be striven for. Surprisingly, this is made possible by the use, according to the invention, of anthraquinone derivatives in combination with chloride ions, since it has been found that the claimed anthraquinone derivatives suppress an adiabatic course of polymerization. The polymerization rate remains strongly proportional to the incident ultraviolet light. The polymerization itself can, after an increase in temperature above 40° C. to 60° C., be interrupted or decreased by turning off or weakening the intensity of the ultraviolet light.

To be sure, it is possible in many cases to polymerize a polymerizable material in layer thicknesses of 2 mm or more in the absence of anthraquinone derivatives, without the polymerization visibly undergoing bubble formation or discoloration. However, also in these cases, local overheatings often occur which are noticeable by an expanded molecular weight distribution of the resulting polymer, and therefor by an increase in that portion of the polymer of low molecular weight. Thus, the method of the invention leads also, in those cases in which the polymerizable mixture even in the absence of anthraquinone apparently does not "run away", to a narrower molecular weight distribution and to a higher average molecular weight.

The danger of overheating directly depends on the quantity of polymerizable double bonds per unit weight of the polymerizing material. Whereas a polymerizable material which contains less than 0.2 equivalent of polymerizable double bonds per 100 grams does not overheat on polymerization, even when it is not cooled, a material which contains more than 0.2, and particularly more than 0.5 up to about 2, equivalent of polymerizable double bonds per 100 g, heats itself in the absence of cooling to more than 80° C. and, as a rule, even to far more than 100° C. In such a case it is unimportant whether 100 g of the material to be polymerized alone comprises 0.2 – 2 mols of a (simply unsaturated) monomer, or whether in addition further non-polymerizable inert materials are present. The higher the content of polymerizable double bonds and the greater the layer thickness, all the less possible is it to control an ultraviolet light polymerization in the presence of atmospheric oxygen by the process of exterior cooling alone and thus to prevent overheating. The invention has special significance for polymerization on a moving carrier, particularly on a circulating endless band. Namely, it has proved difficult to operate such installations while excluding atmospheric oxygen.

The invention is not limited to the polymerization of water-soluble monomers, but encompasses also the polymerization of monomer mixtuers which, in toto, are water-soluble or which give homogeneous mixtures with water, even when they contain monomer components which alone are not water-soluble. The invention is preferably used for the polymerization of water-soluble monomers or monomer mixtures in a monomer concentration of at least 75 percent. The remainder is preferably water. The 75 - 100 percent polymers obtained are solid substances which can be ground to a granular water-soluble material.

If the monomers to be polymerized comprise more than 50 percent by weight of acrylamide or methacrylamide, it is particularly important to avoid overheating on polymerization, since the polymers of the aforementioned amides have a tendency to cross-link. The polymerization of such a material is, for this reason, a preferred embodiment of the invention. Further unsaturated water-soluble monomers, which can be polymerized according to the invention either alone or in admixture with the aforementioned amides are acrylic acid and methacrylic acid, their hydroxyalkyl esters or aminoalkyl esters, as well as their aminoalkyl amides. Examples of monomers of this type are 2-hydroxyethyl-acrylate or -methacrylate, 2-hydroxypropyl-acrylate or -methacrylate, 4-hydroxybutylacrylate or -methacrylate, dimethylaminoethyl-acrylate or -methacrylate, diethylaminoethyl-acrylate or -methacrylate, piperidinoethyl-acrylate or -methacrylate, or morpholinoethylacrylate or -methacrylate. Also, the water-soluble salts or quaternization products of the aforementioned aminoalkyl esters and aminoalkyl amides come into consideration, as well as vinyl pyrrolidone, vinyl imidazole, vinyl imidazoline, vinyl pyridine, vinyl sulfonic acid, styrene sulfonic acid, acryltaurine or methacryltaurine, inter alia. As non-water-soluble comonomers, which can only be used in such amounts that water-solubility is retained, the alkyl esters of acrylic acid and methacrylic acid, acrylonitrile or methacrylonitrile, styrene, vinyl toluene, vinyl chloride, vinylidene chloride, vinyl esters, or maleic acid anhydride can be mentioned, for example.

Acrylic acid and its derivatives are distinguished from other monomers by a particularly large rate of propagation when they are polymerized. The danger of an adiabatic polymerization is particularly large for these materials. Thus, the polymerization of acrylic acid and its water-soluble derivatives, or of mixtures which predominantly comprise these materials, is a preferred object of the invention.

The polymerizing mixture, apart from insoluble inert materials optionally dispersed therein, should form a homogeneous phase. To the extent that the aforementioned monomers are not present in a liquid form at temperatures between 0° C. and 100° C., they can be converted by small amounts of solvents into an homogeneous phase. Among the solvents, water is the most important. However, in addition thereto or instead thereof, organic solvents such as alcohols, ketones, acetic acid, formamide, and the like come into consideration. Crystallized monomers, such as acrylamide or methacrylamide, can be introduced in solid form in mixtures with liquid components. They dissolve or melt in the course of the polymerization and the required heat of fusion or heat of solution absorbs a portion of the heat of polymerization which is released.

For carrying out the invention, water-soluble anthraquinone derivatives which carry no substituents in the 1,4,5, and 8-positions come into question. Thus, they should have at least one substituent in the 2-position, and may have one or more further substituents in the 3-, 6-, and 7-positions, which substituent or substituents have above all the object of providing water-solubility. The anthraquinone derivatives can have carboxy and-/or sulfonic acid groups per se as substituents, or may be substituted with a radical such as —OCH$_2$C-H$_2$OSO$_3$H or —OCH$_2$COOH in which such groups are present. The acid groups are preferably in their salt form. Anthraquinones having hydroxy and amino groups often have a polymerization inhibiting effect and are then less suitable. For example, the alkali salts of anthraquinone-2-sulfonic acid, of anthraquinone-2,6-disulfonic acid, and of anthraquinone-2-carboxylic acid belong to the group of anthraquinone derivatives which are usable according to the present invention.

In favorable cases, even amounts of anthraquinone of 1 ppm are effective. In practice, amounts between 10 and 100 ppm are most often added, in each case calculated on the polymerizing material. More than 1000 ppm are not necessary even in unfavorable cases.

In addition to the anthraquinone derivative, the material to be polymerized must contain at least 10 ppm, preferably more than 100 ppm, of dissolved chloride ions. These may derive, for example, from the monomers, such as a hydrochloride of a dialkylaminoalkyl-acrylate or -methacrylate. However, chlorides of whatever other cations may be added, provided they dissolve in the reaction mixture, e.g. alkali metal chlorides, alkaline earth metal chlorides, aluminum chloride, ammonium chloride, or the chlorides of organic amines. Free hydrogen chloride can also be used.

Although the anthraquinone derivative, together with the chloride, acts as a photoinitiator, other known photoinitiators such as benzoin, benzoin ether, azo-bis-isobutanol, etc., can also be present in the usual amounts. Polymerization is initiated by irradiation with ultraviolet light of a wave length from 360 - 400 nm, for example from a mercury high pressure lamp, at temperatures between 0° C. and 100° C., preferably in the region from 20° C. to 60° C. It is suitable to maintain the chosen temperature by cooling the carrier or by the conduction thereover of air, or at least to regulate the ultraviolet radiation such that the polymerization temperature increases only slowly and does not enter into the region wherein the disadvantages described earlier herein must be taken into consideration.

The water-soluble polymers so obtained have the usual uses as binders, dressing- and coating agents, thickening agents, flocculation agents, and the like. Because of the possibility for preparing water-soluble polymers in a highly concentrated solid form, the invention has particular significance for the preparation of sedimentation agents and flocculation agents.

Typical embodiments of the invention are described in the following Examples, given by way of illustration. It is usual, in the polymerization art, to "degas" the monomer mixture to be polymerized, e.g. to put it under vacuum for a period of time to remove dissolved oxygen. The oxygen would otherwise delay the beginning of polymerization. This measure is not necessary in the method of the invention. Even without a previous degassing, no induction period occurs. To avoid an undesired premature polymerization of the mixture, one can even introduce air or oxygen thereinto and begin the polymerization directly thereafter. A further advantage of this insensitivity to atmospheric oxygen is in the tack-free surface of the polymer layer which is produced.

EXAMPLE 1

A heterogeneous mixture (crystal slurry) is prepared from the following and is put into an aluminum pan, lined with a polyester film, in a layer thickness of 1 cm:

42.5 parts of acrylamide;
42.5 parts of 2-methacryloyloxyethyl-trimethylammonium chloride;
15 parts of water;
0.6 part of pentaerythritol-tetrathioglycolate;
0.005 part of anthraquinone-2-sulfonic acid, Na-salt;
0.004 part of benzoin; and
0.1 part of ethylene diamine tetraacetic acid, Na-salt.

The pH value of this solution is 5.2. The solution is irradiated at a distance of 12 cm with a super-actinic fluorescent lamp having a maximum in its spectral energy distribution at 360 nm. At the beginning of the irradiation, the mixture becomes homogeneous as a result of the increase in temperature. The intensity of irradiation is coupled to the polymerization temperature by controllers and thermoelements: on reaching a temperature of 60° C. in the layer, the lamp turns off. In this way, the mixture is polymerized for 31 minutes isothermally at 60° C.; thereafter, the temperature does not increase more despite continuous irradiation. The conversion obtained is nearly 100 percent. The layer is now hard and brittle and can be ground. A 1 percent aqueous solution of the polymer has a viscosity of 4800 m pascal seconds (pas) and is highly effective as a flocculating agent.

EXAMPLE 2

A solution of:

59.5 parts of acrylamide;
25.5 parts of 2-methacryloyloxyethyl-trimethylammonium chloride;
15 parts of water
0.7 parts of pentaerythritol-tetrathioglycolate;
0.01 part of anthraquinone-2,6-disulfonic acid, Na-salt;
0.0075 part of benzoin ethyl ether; and
2.5 parts of formamide is heated to 40° C. in a layer thickness of 0.7 cm on a movable belt, covered with a polyester film, which moves at a rate of 12 meters/hour over a 3 meter long polymerization track. The material is intermittently irradiated at temperatures of 60° – 70° C. with ultraviolet light (lamps such as in Example 1) from a distance of 50 centimeters. The irradiation intervals are 15 seconds long, in each case interrupted by 25 seconds of darkness. After a dwell time of 15 minutes under the lamps, the polymer is hard, brittle, clear, and bubble-free, and can be ground. A 1 percent aqueous solution thereof has a viscosity of 5000 m pas. sec. and is highly effective as a flocculating agent.

EXAMPLE 3

A solution of:

56 parts of acrylamide;
24 parts of 2-methacryloyloxyethyl-trimethyl ammonium chloride;
20 parts of water;
1 part of pentaerythritol-tetrathioglycolate; and 0.02 part of anthraquinone-2-sulfonic acid, Na-salt is heated to 30° C. and introduced to a height of 700 mm in a 600 ml glass beaker. A thermoelement is placed in the middle of the solution which, as in Example 1, permits control of irradiation by the polymerization temperature. (The lamp is as in Example 1; the distance of the lamp is 12 cm). After 3 hours of intermittent ultraviolet irradiation, no increase in temperature is any longer evident. The polymer is present as a glassy, solid, bubble-free cylinder having a diameter of 8.5 cm and a height of 6.5 cm. This shows that anthraquinone derivatives also make possible the preparation of thick blocks of highly concentrated polyelectrolyte solutions.

EXAMPLE 4

A mixture of:

75 parts of acrylamide;
10 parts of sodium acrylate;
15 parts of water;
0.4 part of pentaerythritol-tetrathioglycolate;
0.005 part of anthraquinone-2,6-disulfonic acid, Na-salt;
0.003 part of benzoin; and
0.015 part of sodium chloride is prepared. Polymerization follows according to Example 1. After irradiation for 62 minutes with the maintenance of isothermal conditions, the polymer is solid. A 1 percent aqueous solution has a viscosity of 2500 m pa. sec. and is effective as a flocculating agent.

EXAMPLE 5

A solution of:

75 parts of 2-hydroxyethylacrylate;
25 parts of water;
0.5 part of sodium chloride;
0.1 part of anthraquinone-2,6-disulfonic acid, Na-salt;
and 0.1 part of benzoin is isothermally polymerized as in Example 1 at 40° C. in a layer thickness of 1 cm. After irradiation for 45 minutes, a flexible, tack-free gel having good swelling properties in water is obtained.

EXAMPLE 6

A mixture of:

59.5 g of acrylamide;
34.0 g of a 75% aqueous solution of methacryloyloxyethyl trimethyl ammonium chloride;
6.5 g of water;
0.085 g of ethylene diamine-tetracetic acid, Na-salt;
0.3 g of a 1% benzoin solution in dimethyl formamide (DMF);
0.43 g of a 1% solution of anthraquinone-2-carboxylic acid in DMF;
3.0 g of a 20% solution of pentaerylthritol tetrathioglycolate in DMF is irradiated in a layer thickness of 5 mm at 60° C. with a UV-lamp spaced 11.5 cm away. A clear, brittle, yellow polymer is formed, from which a 1% aqueous solution having a viscosity of 2400 m pa. sec. can be prepared.

What is claimed is:

1. A method for the free radical polmerization or copolymerization of at least one unsaturated water-soluble monomer or monomer mixture, alone or in admixture with non-polymerizable inert materials, said monomer or monomers having a content of from 0.2 – 2 equivalents of polymerizable double bonds per 100 grams of the material to be polymerized, which comprises irradiating said monomer or monomers with ultraviolet light while in a layer thickness between 2 and 100 mm, at a temperature between 0° C. and 100° C. and in the presence of atmospheric oxygen, the material to be polymerized further containing at least 1 ppm of a water-soluble anthraquinone substituted in at least the 2-position and unsubstituted in the 1,4,5 and 8-positions and at least 10 ppm of dissolved chloride ions.

2. A method as in claim 1 wherein said anthraquinone has the formula

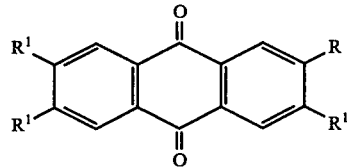

wherein R is —SO$_3$H or —COOH and R$^1$ is —SO$_3$H, —COOH, or hydrogen, or is a water-soluble salt of such a Compound.

3. A method as in claim 1 wherein said water-soluble monomer or monomers are polymerized in an at least 75 percent aqueous solution.

4. A method as in claim 3 wherein the monomer or monomers to be polymerized comprise more than 50 percent by weight of at least one member selected from the group consisting of acrylamide and methacrylamide.

5. A method as in claim 1 wherein an additional photoinitiator is employed.

6. A method as in claim 1 wherein the polymerization is carried out on a movable carrier.

* * * * *